Dec. 18, 1962 M. H. GROVE 3,068,896
WELL VALVE CONSTRUCTION
Filed July 31, 1959 11 Sheets-Sheet 1
FIG_1_
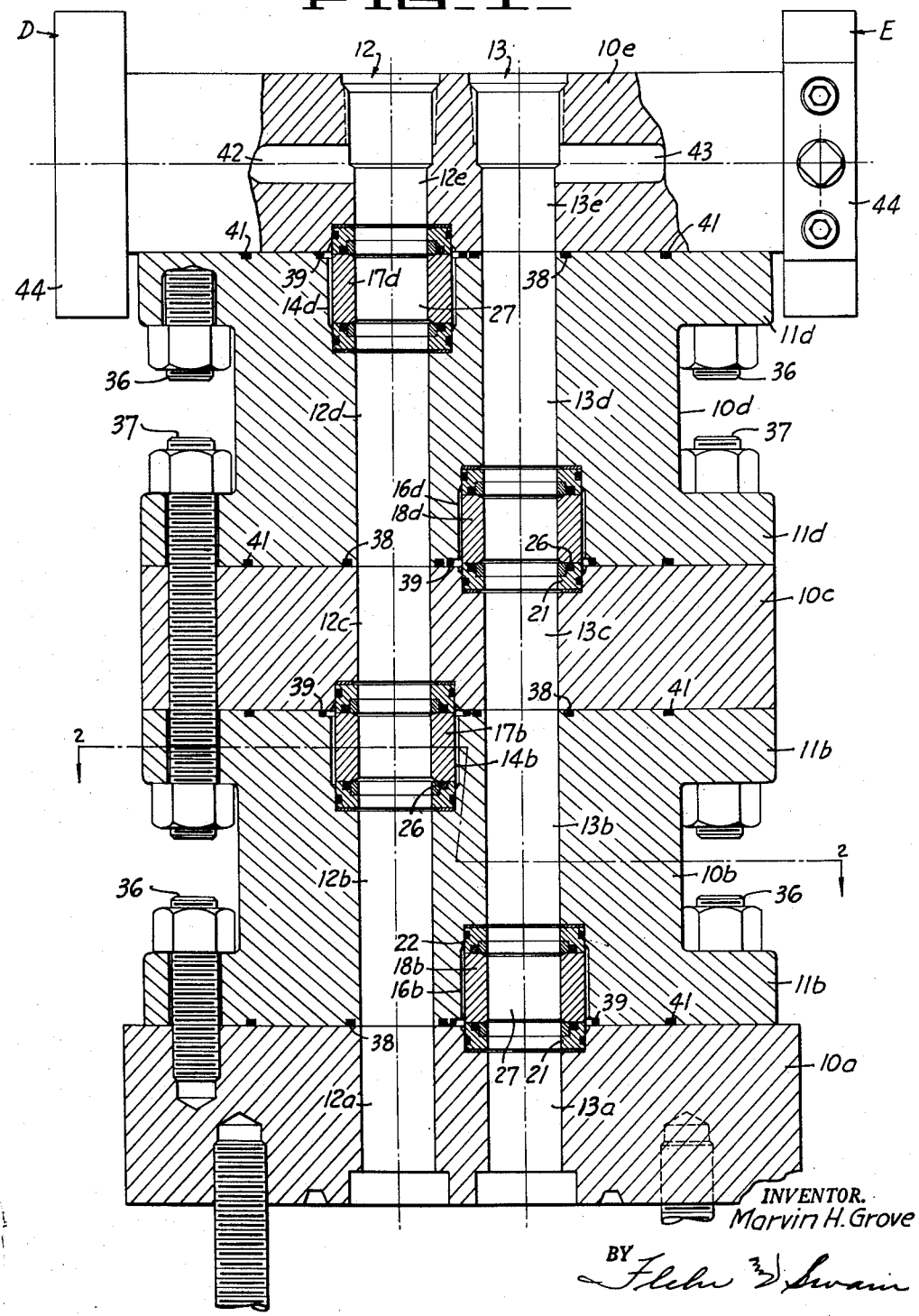
INVENTOR.
Marvin H. Grove
BY
ATTORNEYS

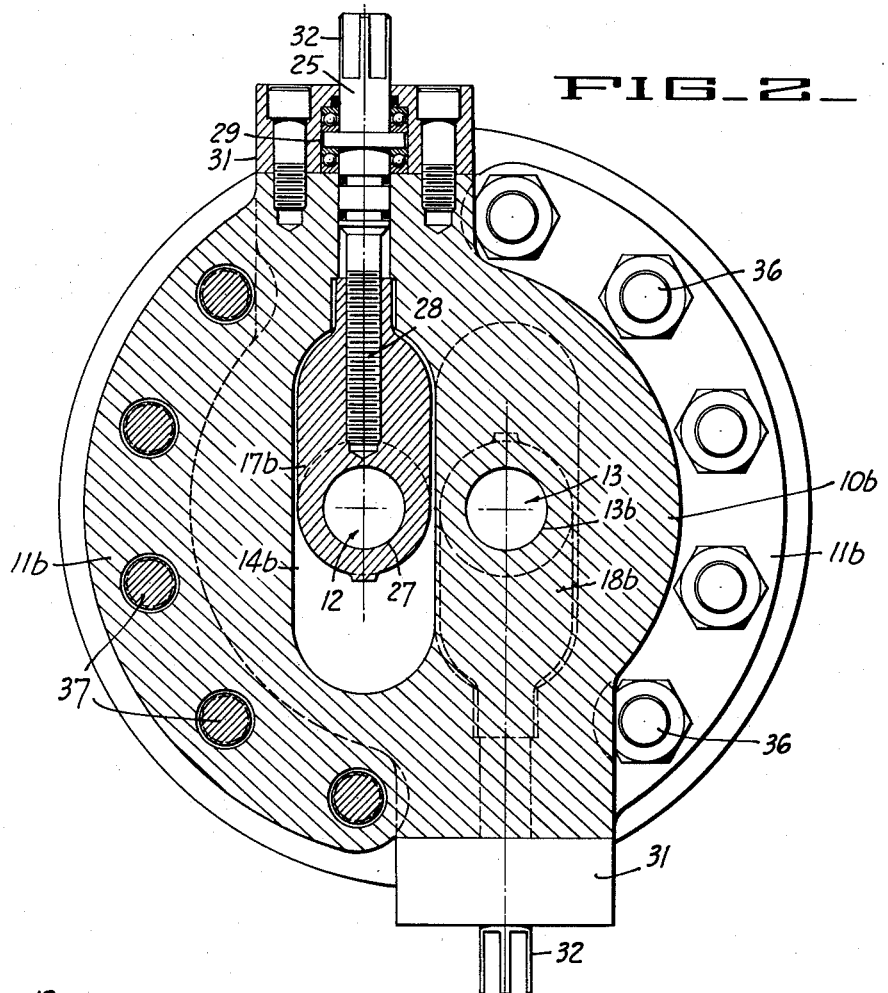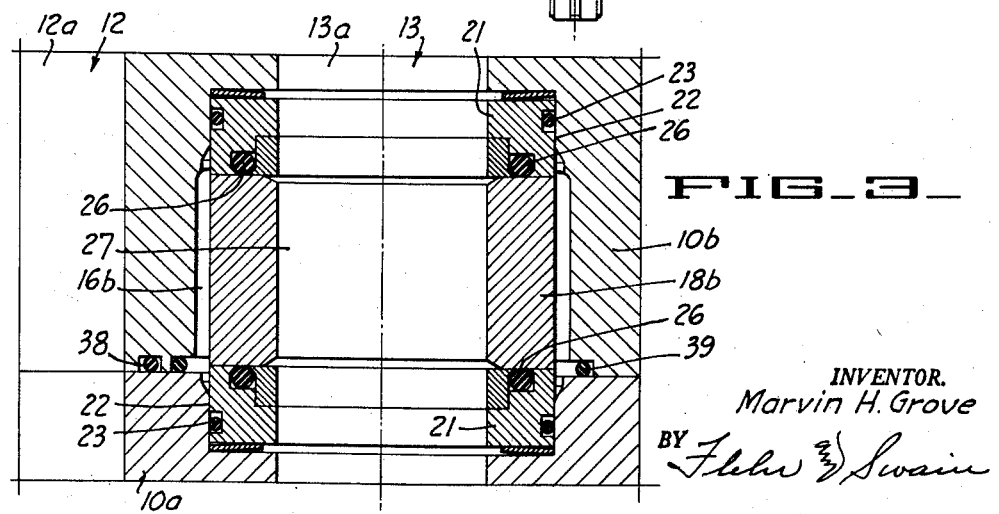

Dec. 18, 1962
M. H. GROVE
3,068,896
WELL VALVE CONSTRUCTION
Filed July 31, 1959
11 Sheets-Sheet 4
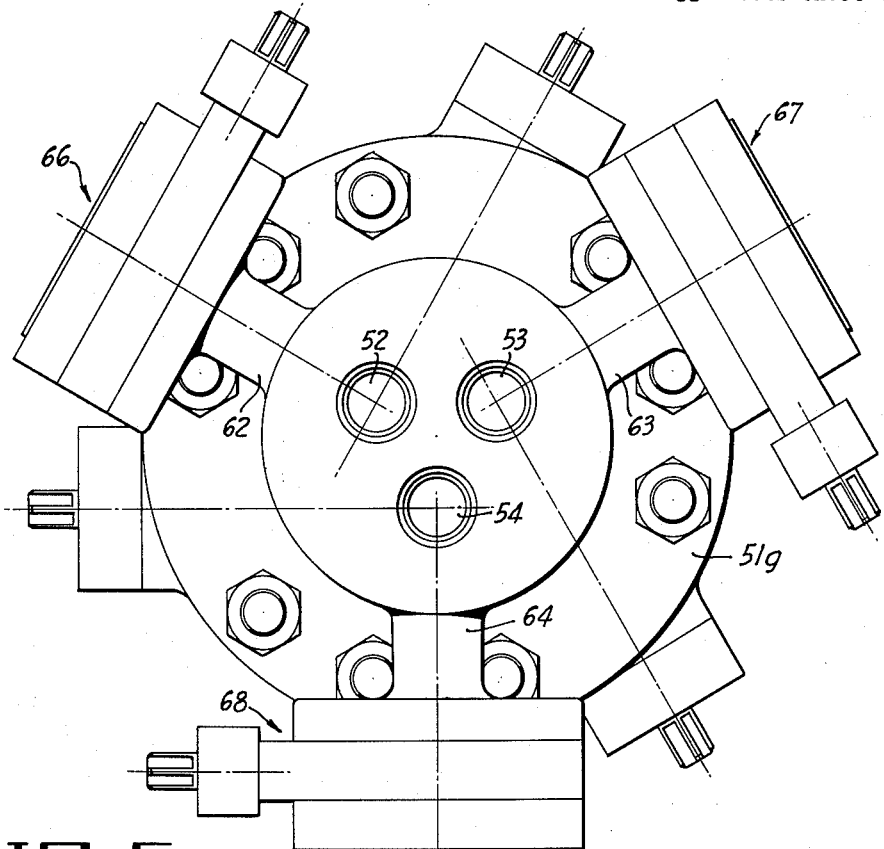
FIG_5_
FIG_6_
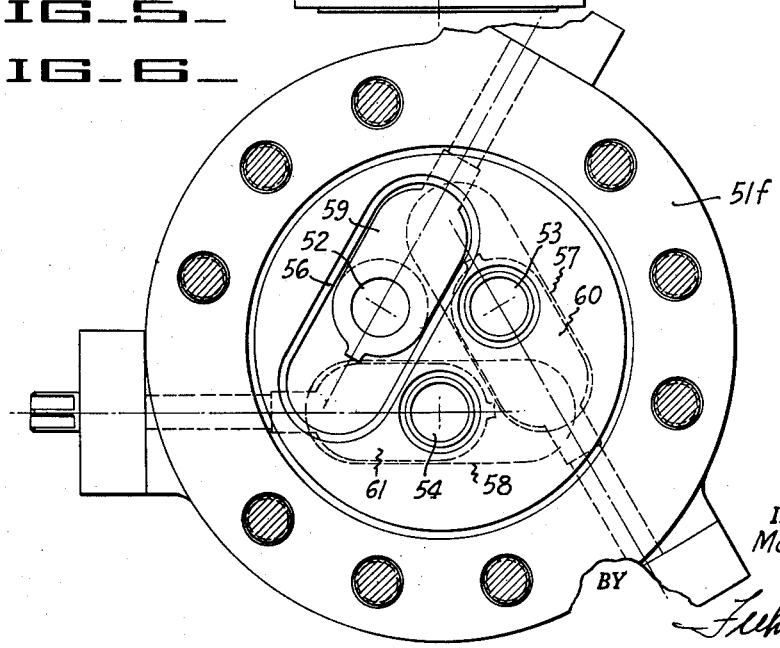
INVENTOR.
Marvin H. Grove
BY
ATTORNEYS

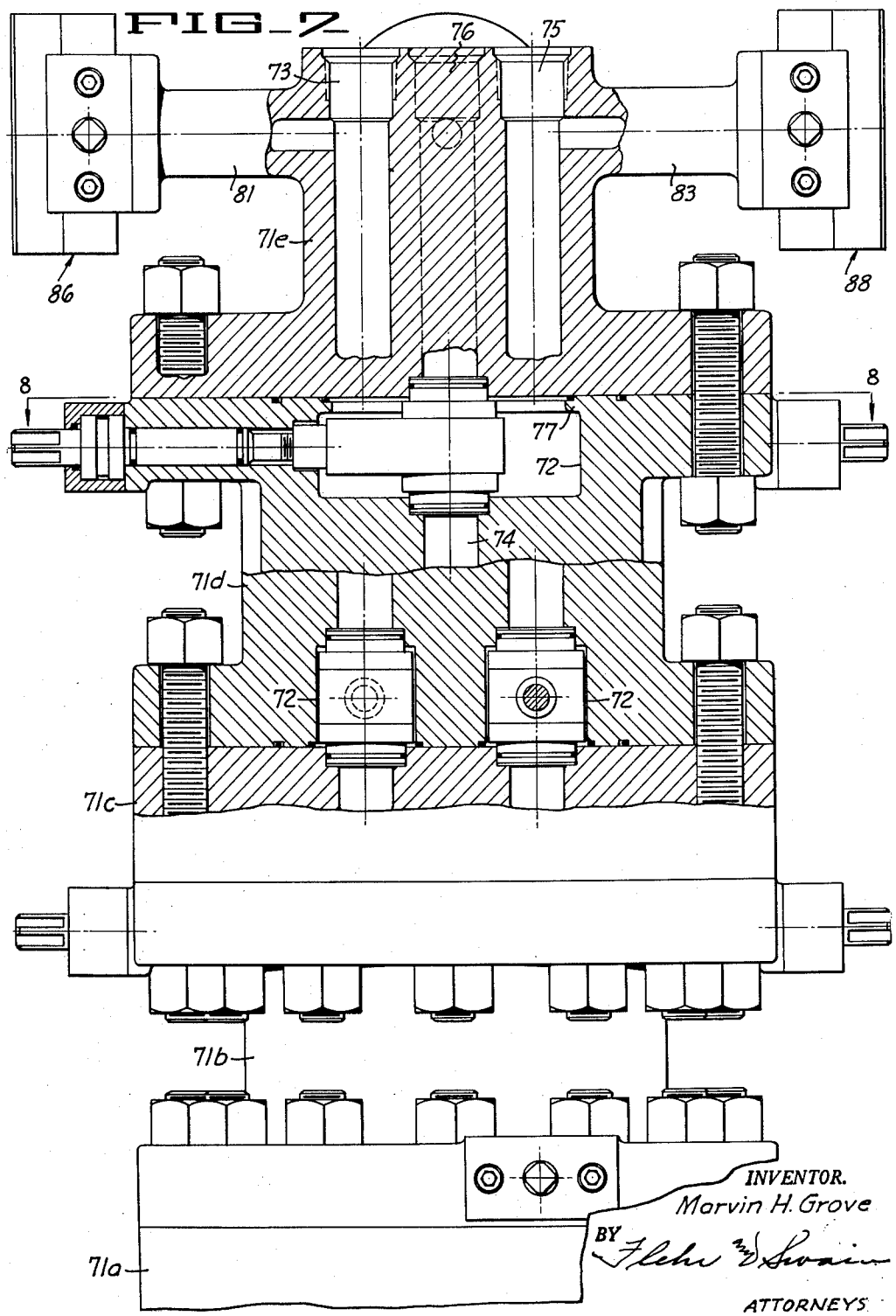

Dec. 18, 1962
M. H. GROVE
3,068,896
WELL VALVE CONSTRUCTION
Filed July 31, 1959
11 Sheets-Sheet 6
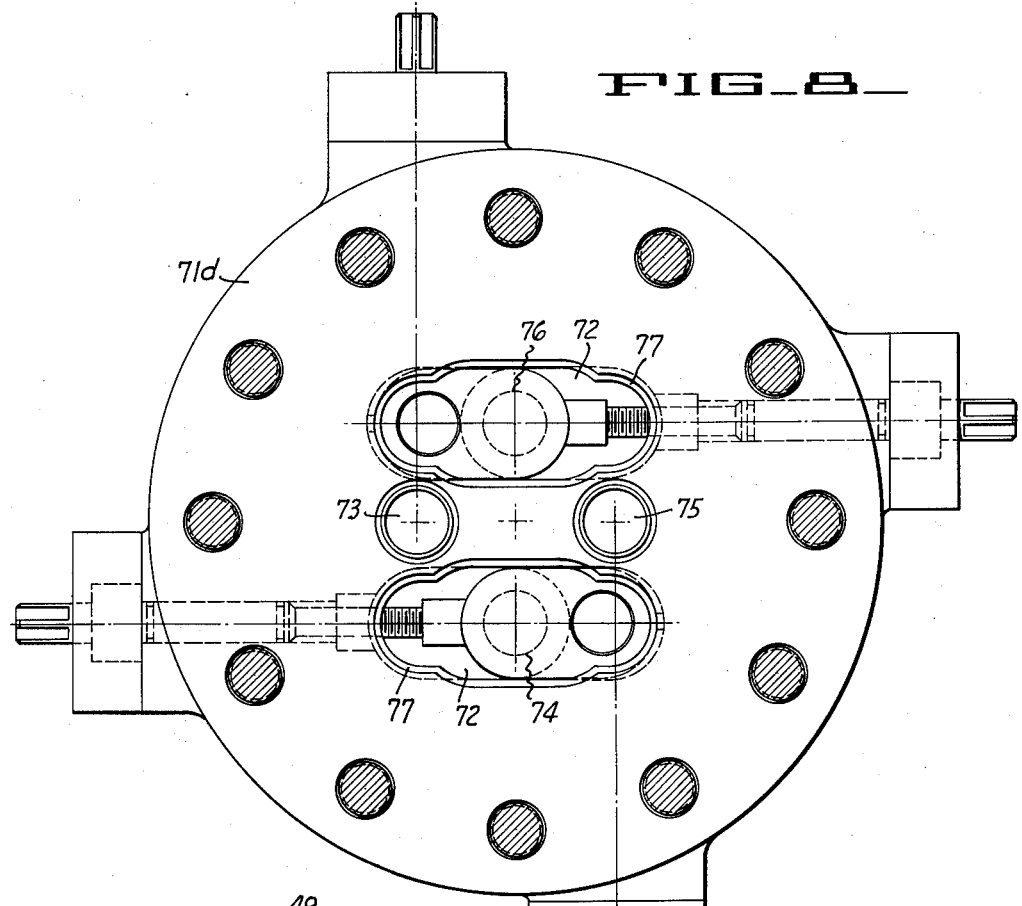
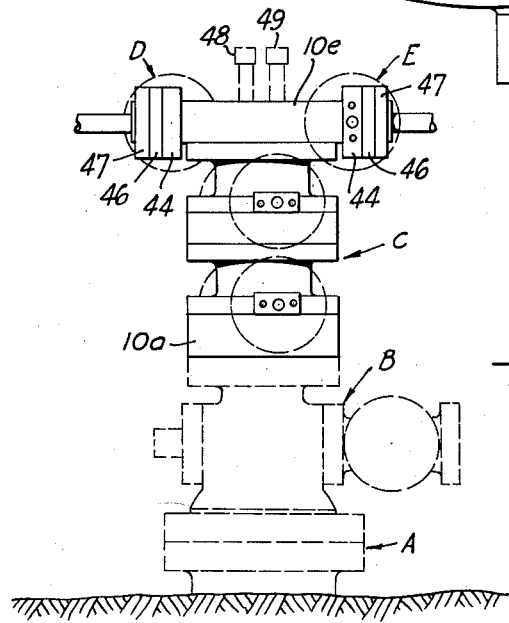
INVENTOR.
Marvin H. Grove
BY
ATTORNEYS

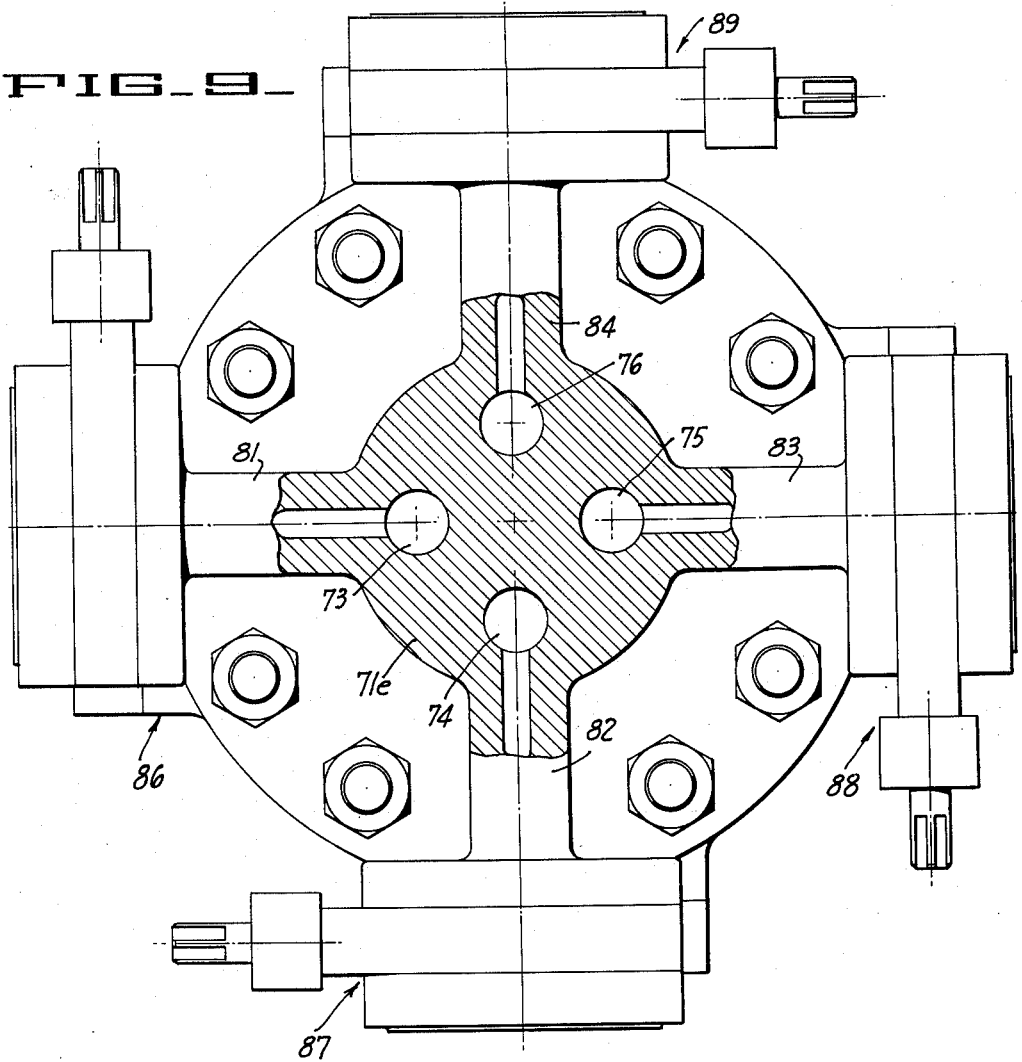

Dec. 18, 1962  M. H. GROVE  3,068,896
WELL VALVE CONSTRUCTION
Filed July 31, 1959  11 Sheets-Sheet 8
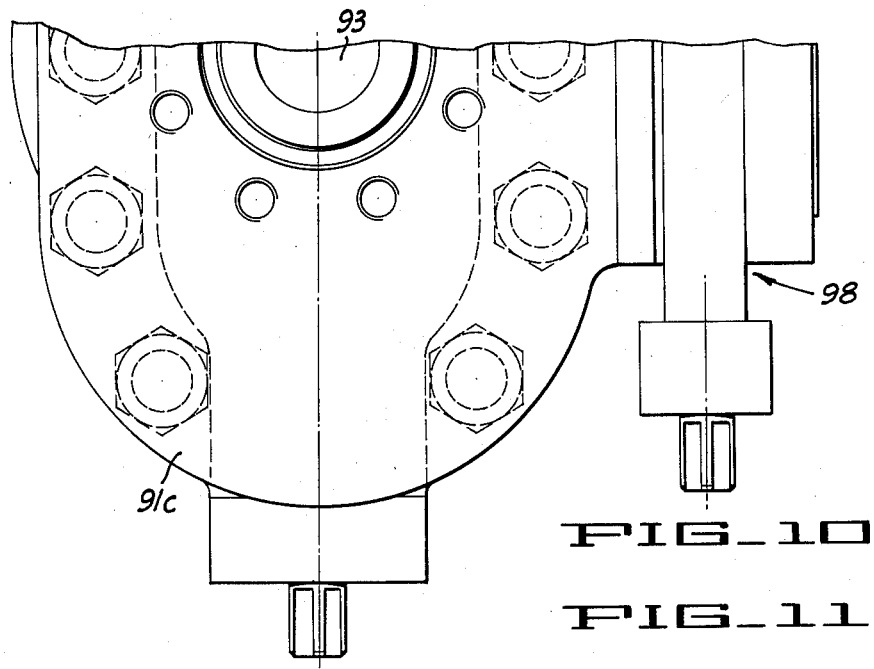
FIG_10_
FIG_11_
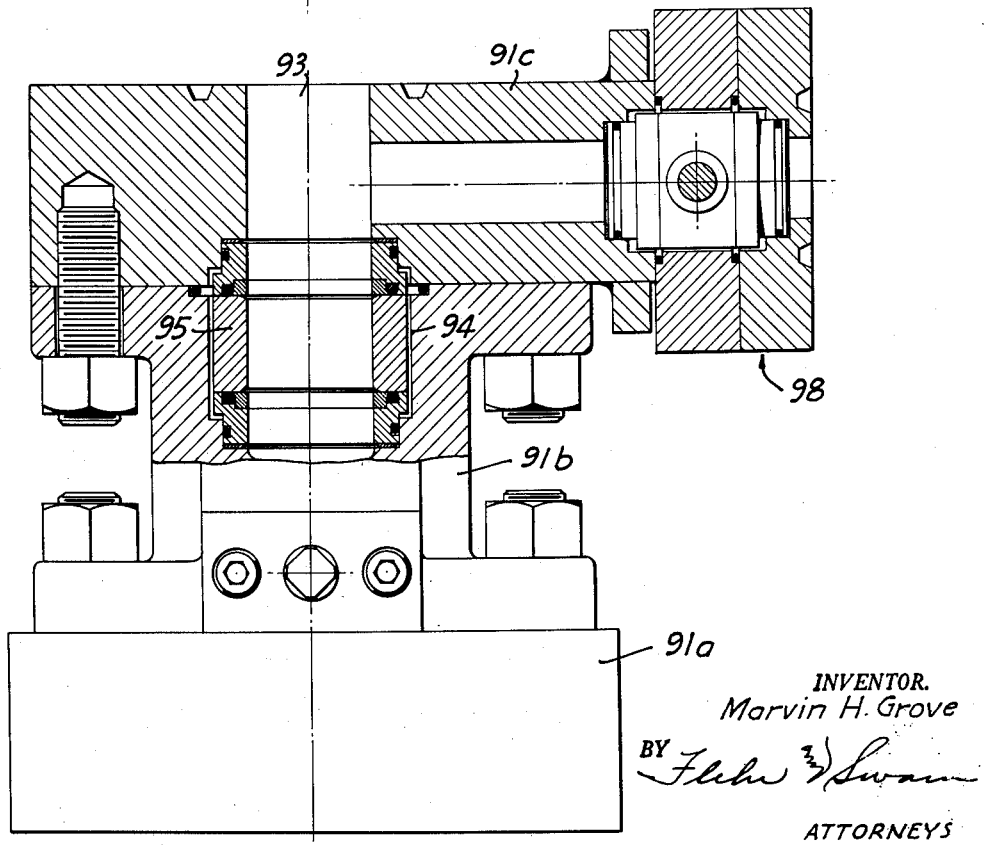
INVENTOR.
Marvin H. Grove
BY
ATTORNEYS Dec. 18, 1962  M. H. GROVE  3,068,896
WELL VALVE CONSTRUCTION
Filed July 31, 1959  11 Sheets-Sheet 9
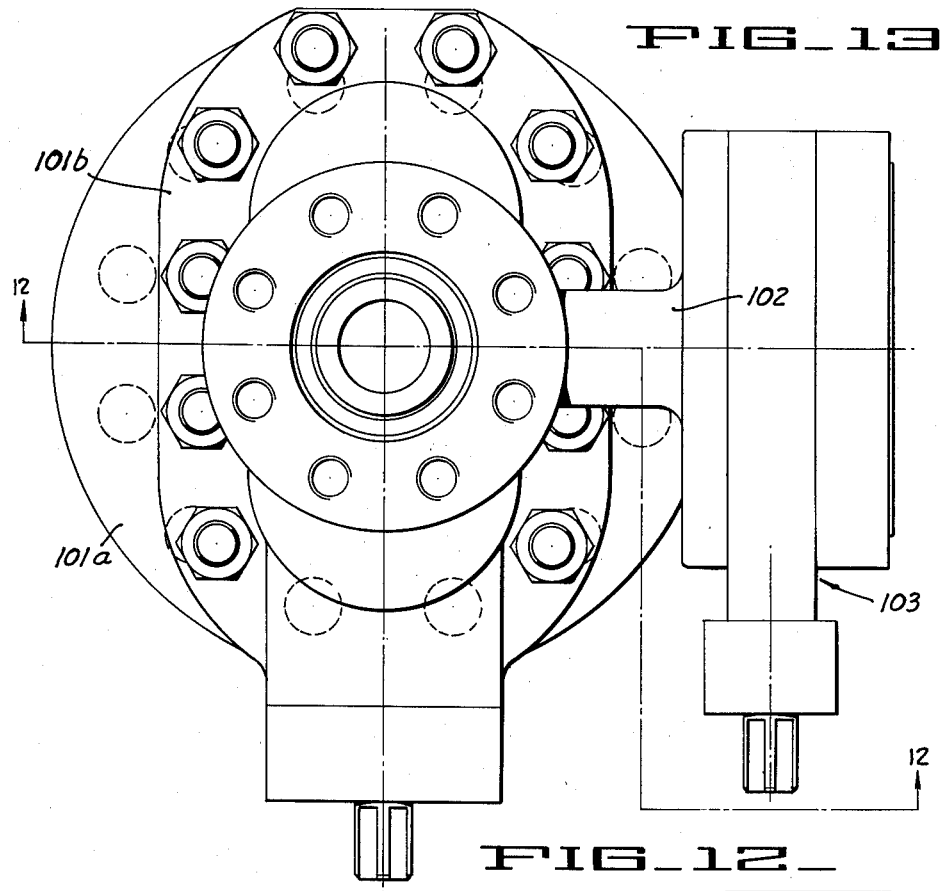
FIG_13_
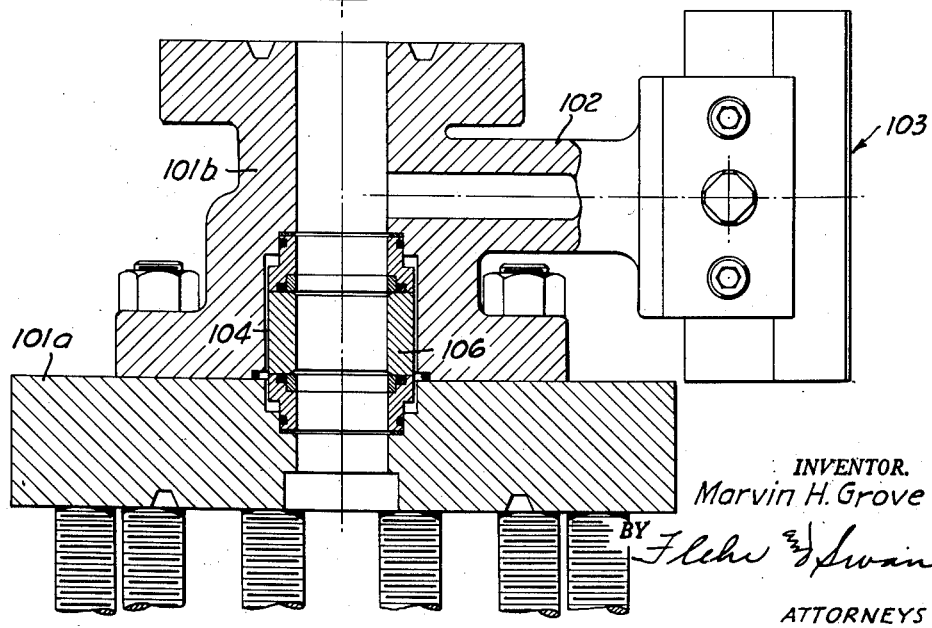
FIG_12_
INVENTOR.
Marvin H. Grove
BY
ATTORNEYS

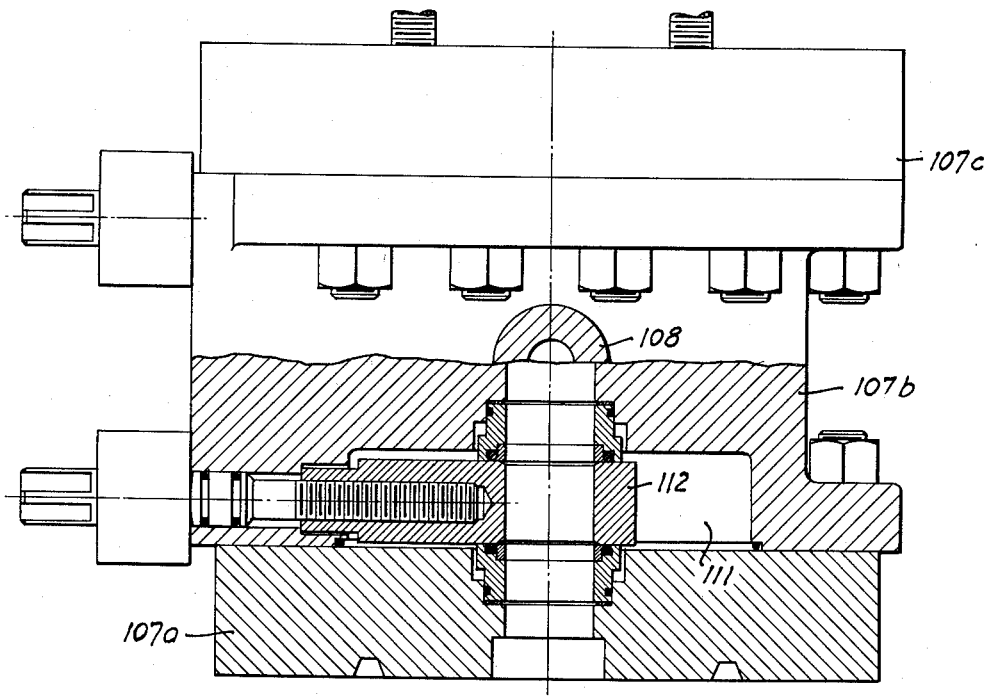
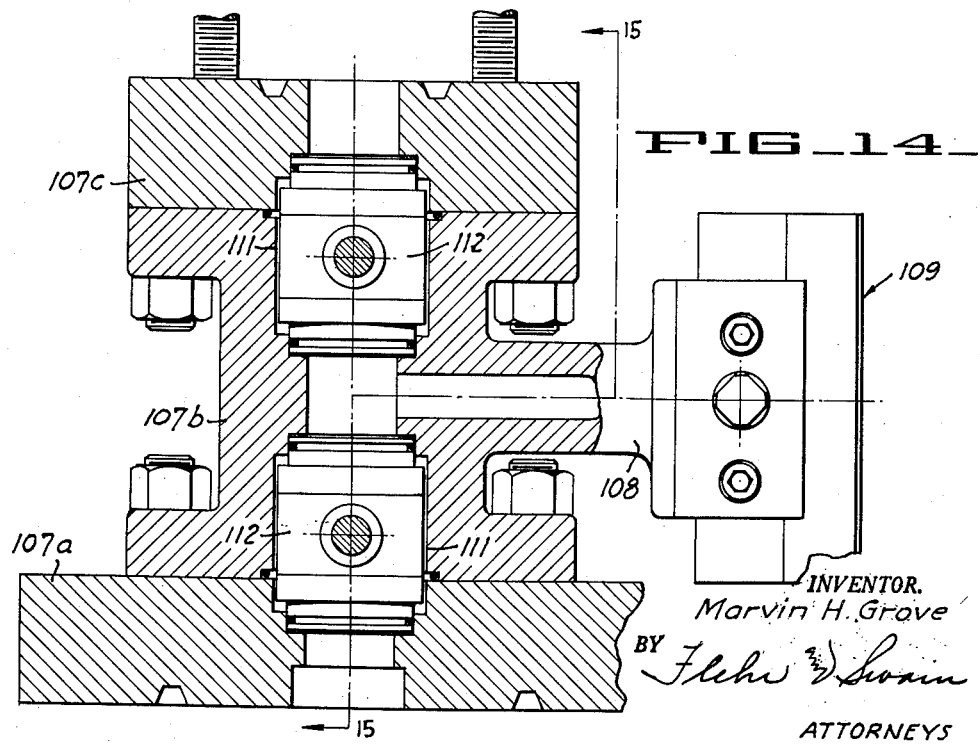

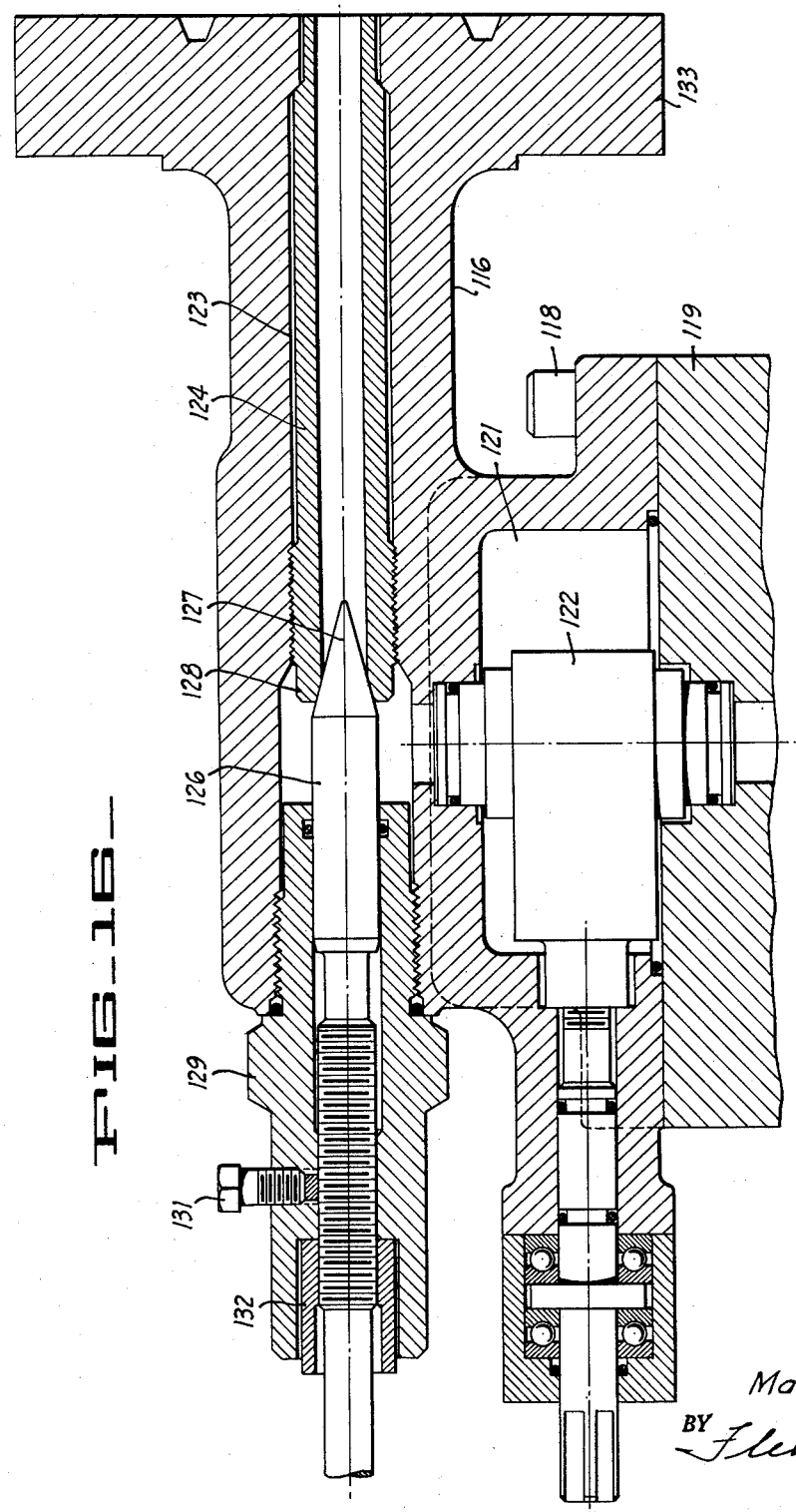

United States Patent Office 3,068,896
Patented Dec. 18, 1962

3,068,896
WELL VALVE CONSTRUCTION
Marvin H. Grove, 340 Hillside Ave., Piedmont, Calif.
Filed July 31, 1959, Ser. No. 830,770
5 Claims. (Cl. 137—594)

This invention relates generally to "Christmas tree" assemblies such as are used in the petroleum industry on oil and gas producing wells. Also it pertains to completion valves and other devices forming parts of Christmas tree assemblies.

It is general practice in the petroleum industry to mount a so-called "Christmas tree" assembly upon the casing head of an oil or gas producing well. This assembly varies in different instances in accordance with the number of producing zones, and particular requirements and conditions. In general, the assembly includes a body having one or more passages for communicating with well tubing, together with one or more main or master valves for controlling flow from the well. The assembly may also include one or more "lubricator" valves, which are employed in series with the main valves. Both main and lubricator valves may be incorporated in a single device known as a completion valve. In addition to the completion valve, the Christmas tree assembly may include such devices as a T-head mounted upon the completion valve, wing valves, flow control chokes, flow control regulators, and automatic shut off devices.

Conventional Christmas tree assemblies are made up from devices which are complete units of themselves. For example, a typical completion valve consists of a heavy steel casting or forging provided with parallel passages (in the case of multiple completion) and valve means of the plug or gate type for each passage. The wing valves employed are likewise complete valves with forged or cast steel bodies and coupling flanges. In general, due to the construction of the individual devices and the manner in which they are assembled, Christmas assemblies are relatively expensive, and in the more complicated installation, they occupy a relatively large amount of space. Also such individual devices are relatively expensive due to their inherent design characteristics. The overall cost increases for the higher operating pressures, which for example, may be of the order of from 5,000 to 10,000 p.s.i. or higher.

In general, it is an object of the present invention to provide an improved Christmas tree assembly which greatly facilitates the construction of a desired Christmas tree arrangement to suit various well requirements.

A further object of the invention is to provide an assembly of the above character which has greater flexibility than prior Christmas tree assemblies, particularly in that it can be more readily assembled to provide a desired arrangement, either at the plant or under field conditions, and individual parts added or removed after the assembly is installed.

Another object of the invention is to provide a Christmas tree assembly which is relatively compact, having reference particularly to the more complicated installations.

Another object of the invention is to provide an improved Christmas tree assembly which is in the form of a plurality of sections, assembled one upon the other.

Another object of the invention is to provide an improved completion valve which avoids the use of an integral valve body made of a steel casting or forging with conventional coupling flanges integral with the body.

Another object of the invention is to provide an improved well completion valve which is in the form of a plurality of assembled sections, stacked one upon the other.

Another object of the invention is to provide an improved completion valve which is relatively flexible with respect to its adaptability to various wells and producing conditions.

Another object of the invention is to provide a completion valve which can be readily serviced in the field and which permits removal of one or more sections without disturbing the others.

Another object of the invention is to provide an improved valve construction suitable for incorporating in a Christmas tree assembly, which employs a relatively simple sectionalized valve body, one integral body section being formed to receive two or more valves.

Additional objects and features of the invention will appear from the following description in which the preferred embodiments have been set forth in detail with the accompanying drawing.

Referring to the drawing:

FIGURE 1 is a section in side elevation illustrating my Christmas tree assembly, the structure including a dual completion valve together with wing valves.

FIGURE 2 is a cross-sectional view taken along the line 2—2 of FIGURE 1.

FIGURE 3 is a cross-sectional detail on an enlarged scale, showing the construction of one of the valves.

FIGURE 5 is a plan view of the assembly shown in FIGURE 3.

FIGURE 6 is a cross-sectional view taken along the line 6—6 of FIGURE 5.

FIGURE 7 is a cross-sectional view in side elevation, showing another embodiment having four flow passages.

FIGURE 8 is a cross-sectional detail taken along the line 8—8 of FIGURE 7.

FIGURE 9 is a plan view of the assembly shown in FIGURES 7 and 8.

FIGURE 10 is a half plan view illustrating a completion valve having a single flow passage and a wing valve.

FIGURE 11 is a cross-sectional view in side elevation showing the assembly of FIGURE 10.

FIGURE 12 is a side elevational view in section, illustrating another single passage structure together with a wing valve.

FIGURE 13 is a plan view of the structure shown in FIGURE 12.

FIGURE 14 is a side elevational view partly in section, showing the embodiment of FIGURE 12 modified to include an additional valve means.

FIGURE 15 is a cross-sectional view taken along the line 15—15 of FIGURE 14.

FIGURE 16 is a cross-sectional view showing a combination wing valve and variable choke that may be employed.

FIGURE 17 illustrates the assembly of FIGURES 1 and 2 mounted on a well.

Figure 4:
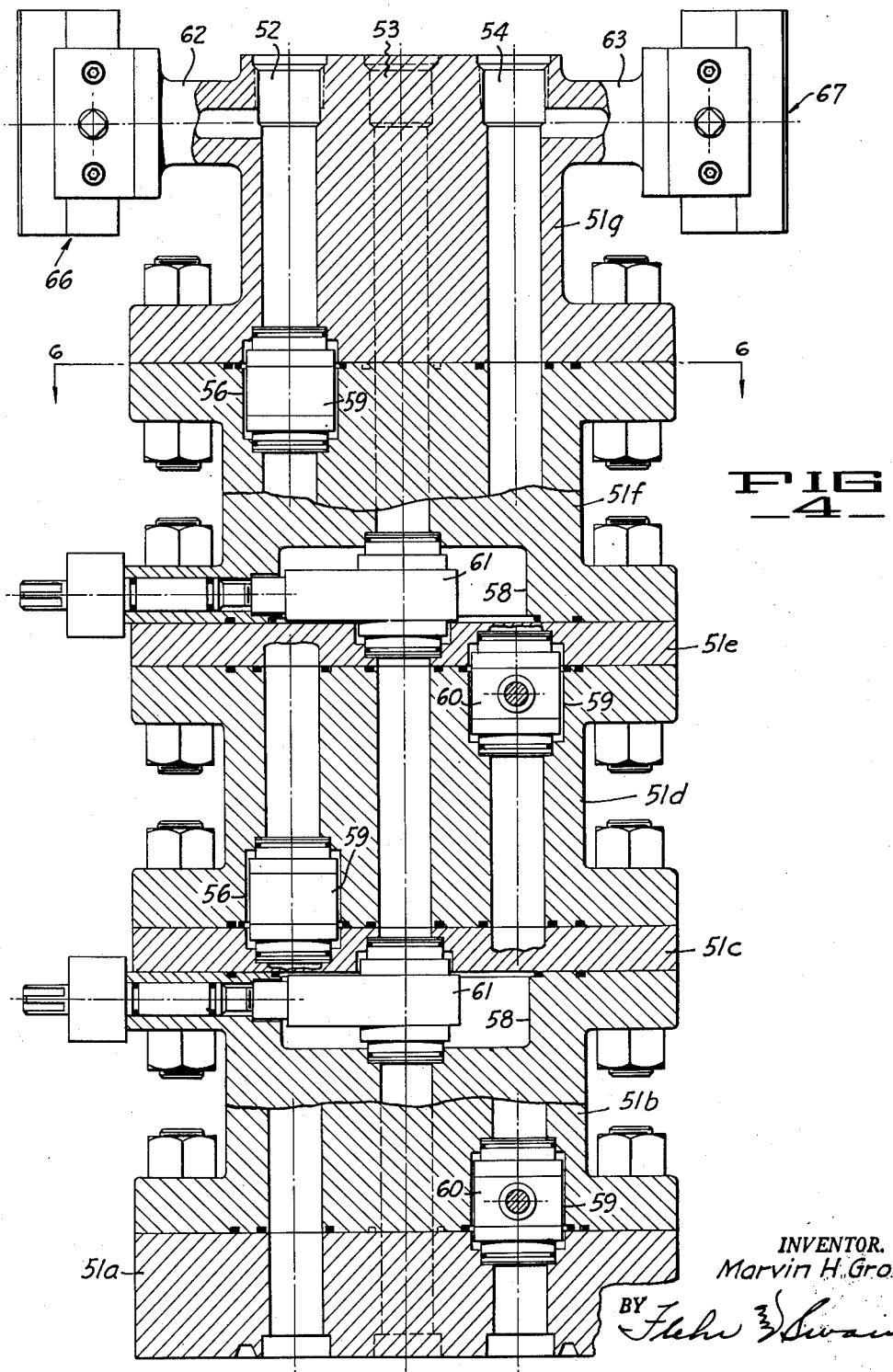
FIGURE 4 is a cross-sectional view like FIGURE 1 in side elevation, illustrating another embodiment having three parallel flow passages.

The present Christmas tree assembly employs a plurality of sections that are assembled one upon the other. In general these sections do not form complete devices of themselves, but when assembled in the order desired, the necessary valves, flow control devices, etc. are provided in a compact and effective manner. By way of example, the completion valve employs a body formed of a plurality of sections disposed one upon the other. Each of these sections is provided with one or more openings that are aligned in the stack, thereby forming straight passages for making connection with producing tubing.

In FIGURES 1 and 2 of the drawing, I have shown a Christmas tree assembly which includes a completion valve having two flow passages (i.e. a dual completion valve). The body part of this assembly is formed of a plurality of sections 10a–10e inclusive. All of these sections have flat parallel faces. Sections 10a, 10c and 10e can conveniently be formed of flat metal plate, such as mill rolled steel. Sections 10b and 10d can be made of steel castings or forgings, with their parallel end faces suitably machined as by grinding. The shaping of these sections can be such as to provide the end flanges 11b and 11d. As viewed in plan, all of the sections can be circular except that certain sections may have projections or extensions as will be presently described.

The assembled sections form the parallel flow passages 12 and 13. Each section is provided with openings whereby when the sections are stacked, the openings are aligned to form the passages 12 and 13. These openings are designated as 12a–12e for passage 12, and 13a–13e for passage 13.

Section 10b is shown provided with recesses 14b and 16b which accommodate the valve members 17b, 18b of the gate type. As shown in FIGURE 1, these recesses are elongated to accommodate the travel of the valve gates in moving the same between full open and closed positions. The section 10d is similarly provided with the recesses 14d and 16d for accommodating the valve gates 17d and 18d.

The construction of the valve means employed can vary in different instances. The particular type of gate valve illustrated in FIGURES 2 and 3 is of the type disclosed in Bryant 2,810,543, which employs sealing means of the resilient O-ring type. It should be understood however that other types of valves can be employed, such as valves provided with metal to metal sealing surfaces. Thus each valve means can consist of a flat plate-like gate 17d having parallel valve working surfaces on its sides. Metal seat rings 21 engage the side faces of the gate, and are slidably fitted within counterbores 22. Sealing means 23, of the resilient O-ring type, serves to prevent leakage between the seat rings and the adjacent body portions. Assuming use of sealing means of the O-ring type such as disclosed in Patent 2,810,543, each seat ring carries a resilient O-ring 26. The gate is provided with a port 27 which registers with passage 12 for full open position.

The means illustrated for moving the gate consists of a stem 22 which has its inner portion 28 in threaded engagement with the gate. The stem is provided with a journal 29 in the bonnet plate 31, and its outer end portion 32 may be squared or otherwise formed for engagement with a hand wheel (not shown).

The other valve means employed can be the same as the valve described above. It will be noted from FIGURES 1 and 2 that the recesses or spaces associated respectively with the passages 12 and 13 for accommodating the various valve gates, are each offset from the central axis of the assembly. Also, the longitudinal center line of each space extends generally tangential to a circle having the central axis of the assembly as its center, and drawn through the centers of the passages 12 and 13.

The various sections are detachably secured together in such a manner as to facilitate both plant and field assembly and modification. Thus, studs 36 are shown for attaching the sections 10a and 10b together. Sections 10b, 10c and 10d are attached together by the bolts 37. These bolts preferably are threaded into the section 10c. Sections 10b and 10e are shown secured together by the studs 37. The sealing means employed between the sections can include seal ring 38 of the O-ring type, surrounding the passages 12 and 13 and seal rings 39 which encompass the valve accommodating recesses. Additional seal rings 41 are shown encompassing both the passages 12 and 13 and the associated valve accommodating recesses.

The lower one of the valves for a given flow passage can be referred to as a main or completion valve, and the upper one as a "lubricator" valve.

FIGURE 17 illustrates how the complete assembly of FIGURES 1 and 2 can be installed on a well. The means A represents a well head, the device B a tubing head carrying tubing hangers, and C the completion valve illustrated in FIGURES 1 and 2 with its lower section 10a directly attached to the tubing head flange. The top body section 10e is shown provided with the wing valves D and E, which connect with associated piping or other devices. As shown in FIGURE 1, this top section 10e is provided with laterally extending flow passages 42 and 43 which communicate respectively with the passages 12 and 13 and which lead to wing valves D and E. Each of the wing valves can be constructed in a manner similar to the valves previously described. Thus a body section 44 can be in the form of a plate, suitably attached to the section 10e. This section is recessed to accommodate the valve gate and associated valve parts. An additional plate-like section 46 (FIGURE 17) is attached to the section 44, and serves to complete the valve and in addition to provide means for coupling to associated parts, such as the piping flanges 47. Instead of or in addition to a wing valve, it is possible to use a choke or flow control valve, or such devices as automatic regulators, shutoff valves and the like. At the top of the assembly, the passages 12 and 13 may connect with associated devices or may be closed by plugs 48 and 49.

The assembly described above, and the completion valve incorporated in the same, has certain advantages over conventional assemblies. The various body sections can be made to standardized dimensions and can be assembled as desired in particular installations. The sections 10a, 10c, and 10e can be of ordinary mill rolled steel plate, by torch cutting and grinding or machining to the desired configuration, and by drilling to provide the required sections 10b and 10d can be formed of steel forgings and castings, with single grinding to provide the desired smooth side faces and drilling to form the required holes. It will be evident that the ease of dismantling and assembling parts, a particular installation can be changed from time to time, without however forming a final assembly which is unduly bulky or complicated. All of the body sections of the assembly are securely bolted together, thus forming a strong rigid framework for the completed structure.

FIGURES 4–6 show a complete assembly which provides three parallel passages instead of two. This assembly includes sections 51a–51g which are attached together by bolts and studs, in the manner previously described. These assembled sections provide parallel passages or bores 52, 53, and 54. Each of the sections 51b, 51d and 51f serve to accommodate two valves, whereby each of the passages is controlled by two valves in series. The disposition of the valve accommodating recesses is illustrated in FIGURE 6. The recesses in this instance are identified by the numbers 56, 57 and 58, and their associated valve gates are identified by numbers 59, 60 and 61. Here again the longitudinal center line of each valve gate accommodating recess extends tangential to a circle having its center coincident with the axis of the assembly and drawn through the centers of the passages 52, 53 and 54.

The details of the valves have been omitted from FIGURE 4, with the understanding that they may be the same as the valve previously described.

The upper or head section 51g is of special construction to provide the lateral extensions 62, 63 and 64. These extensions serve to mount the wing valves 66, 67 and 68, which in turn are arranged to connect with associated piping.

In addition to a dual or triple assembly, it is possible to employ additional passages in a quadruple assembly such as shown in FIGURES 7 and 8. In this instance, only sections 71a, 71b, 71c, 71d and 71e are employed. Each of the sections 71b and 71d in this instance serves to accommodate four valves. As shown in FIGURE 8, the disposition of the valve accommodating recesses 72 is such that the longitudinal center line of each recess extends tangentially to a circle, the circle having its center coincident with the vertical axis of the assembly and being drawn through the centers of the passages 73, 74, 75 and 76. As shown particularly in FIGURE 7, each of the recesses 72 in this instance is inset into the corresponding body section, and a lip or flange 73 is provided at the open end of each recess, to cooperate with sealing means (i.e. of the O-ring type) interposed between this lip and the face of the adjacent section. Otherwise the recessing required for accommodating the resilient O-ring seal would extend too close to an adjacent passage. The top section 71e (FIGURE 9) is likewise a casting provided with the lateral extensions 81, 82, 83 and 84 which serve to carry the wing valves 86, 87, 88 and 89.

While my assembly may incorporate dual, triple or quadruple completion valves for wells having two or more well tubes reaching to different producing zones, in some instances a single completion valve is sufficient. The single completion valve shown in FIGURES 10 and 11 includes the body sections 91a, 91b, and 91c. A single straight passage 93 extends through these sections, and section 91b is provided with recesses 94 for accommodating the two valve gates 95. The remaining valve parts can be the same as previously described. Section 91b, in this instance need not have a circular contour, but can be laterally flattened or oval in section, as shown in FIGURE 10. The top section 91e is shown provided with a wing valve 98.

In some instances, a single completion valve with only one valve means will suffice. Thus, in this instance (FIGURES 12 and 13), the assembly can consist of the sections 101a and 101b, the latter section being in the form of a casting or forging, provided with a lateral extension 102. A wing valve 103 is shown attached to the extension 102. The section 101b is provided with a recess 104 to accommodate the gate 106 of a master valve, and the extension 102 is recessed to accommodate the seat ring of wing valve 103.

FIGURES 14 and 15 show another form of single completion valve with both master and lubricator valves, and with a side extension serving to mount a wing valve. Thus, in this instance, the body consists of the sections 107a, 107b and 107c, with the section 107b having a side extension 108 for mounting the wing valve 109. The section 107b also has recesses 111 for accommodating the gates 112 of the master and lubricator valves. Extension 108 is recessed to accommodate a seat ring of the wing valve 109.

As shown in FIGURE 16, a choke can be incorporated in the assembly, either in combination with, or separate from a wing valve. The body section 116 in this instance is attached by bolts or studs 118 to a body portion 119, which is a section of the completion valve. The recess 121 serves to accommodate the gate 122 of a wing valve.

The body 116 is provided with a bore 123 to accommodate the choke tube 124, and the flow control member 126. Member 126 is in the form of a rod having a tapered end 127 which is adapted to be adjustably positioned with respect to the seat end 128 of the tube 124. The rod 126 extends to the exterior through a closure bonnet 129. It has threaded engagement with the bonnet, and a desired adjustment can be maintained by the clamping set screw 131 and the locket nut 132. Associated piping can be connected to the discharge end of the choke tube 124 by the coupling flange 133.

I claim:

1. In a completion valve, the combination of a plurality of first body sections having an outside first diameter; at least one second body section having an outside second diameter substantially less than said first diameter, extending throughout at least a portion of its height; said body sections being stacked end-to-end with one second body section between two first body sections; a plurality of bolts holding said stacked body sections together; said bolts passing through margins of said first body sections and outside of said second diameter of said second body section, each said body section having flat, parallel end faces and formed with at least one flow passage lying within said second diameter, the flow passages of said sections being aligned; said second body section formed with an enclosed, elongated space formed in one end of the same and communicating with said flow passage; said space lying inside the projection of said second diameter; a valve gate movable within said space, valve gate actuating means; first valve means forming a first valve working surface, second valve means forming a second valve working surface, said valve means being located on opposite sides of said gate and each embracing said flow passage, one of said valve means being located within said second body section and the other said valve means being located within the adjacent first body section facing said space; said valve working surfaces and said gate cooperating to form a fluid pressure seal closing said flow passage when said gate is moved in said space to closed position; and means forming fluid pressure seals between said body sections to prevent leakage between the same from said passage.

2. A completion valve according to claim 1 in which said second body section is formed with end flanges with an outside diameter substantially equal to said first diameter and said bolts pass through said flanges.

3. A completion valve according to claim 1 wherein an upper one of said body sections is formed with at least one laterally extending flow passage communicating with said first named flow passage in said upper body section.

4. In a completion valve for use on producing wells of the type having a plurality of tubes each connected to a different stratum, the combination comprising, a plurality of first body sections having an outside first diameter; a plurality of second body sections having an outside second diameter substantially less than said first diameter extending throughout at least a portion of its height; said body sections being stacked end-to-end with one second body section between two first body sections; a plurality of bolts holding said stacked body sections together, said bolts passing through margins of said first body sections and outside said second diameter of said second body section, each said body section having flat, parallel end faces and formed with a plurality of separate straight flow passages, each lying within said second diameter, the flow passages of said sections being aligned and offset with respect to the central axis of said sections, some of said body sections formed with enclosed, elongated spaces formed in at least one end of the body section and communicating with one only of said flow passages; flow control valve means disposed within certain of said sections for controlling flow through said passages; each said valve means including a valve gate movably disposed in one of said spaces and actuating means for said gate, the body section adjoining said space closing off said space; all of said spaces lying inside the projection of said second diameter and being disposed so that the longitudinal center line of each space is tangential to a second circle drawn through the center of said passages and having the center axis of said sections as its center; and means forming fluid pressure seals between said body sections to prevent leakage between the same from said passages.

5. A completion valve according to claim 4 in which an upper one of said body sections is formed with at least two laterally extending second flow passages, each of said second flow passages communicating with one of said first named flow passages in said upper body section.

References Cited in the file of this patent

UNITED STATES PATENTS

| | | |
|---|---|---|
| 1,525,801 | Crawford | Feb. 10, 1925 |
| 1,709,949 | Rasmussen et al. | Apr. 23, 1929 |
| 2,335,335 | Penick | Nov. 30, 1943 |
| 2,651,324 | Hodgson et al. | Sept. 8, 1953 |
| 2,746,709 | Minor | May 22, 1956 |
| 2,810,543 | Bryant | Oct. 22, 1957 |
| 2,834,368 | Gray | May 13, 1958 |
| 2,859,773 | Wallace | Nov. 11, 1958 |
| 2,877,780 | Whitley | Mar. 17, 1959 |
| 2,885,005 | Rhodes | May 5, 1959 |